US005699101A

United States Patent [19]

Allen

[11] Patent Number: 5,699,101

[45] Date of Patent: Dec. 16, 1997

[54] ARTICLE FOR COOLING A SHEET OF THERMALLY-PROCESSED MATERIAL

[75] Inventor: John J. Allen, Mendota Heights, Minn.

[73] Assignee: Minnesota Mining and Manufacturing Company, St. Paul, Minn.

[21] Appl. No.: 539,856

[22] Filed: Oct. 6, 1995

[51] Int. Cl.[6] .......... B41J 2/315; G03B 27/52; G03G 21/00; F27B 9/28

[52] U.S. Cl. .......... 347/212; 355/30; 355/309; 432/59; 165/80.3

[58] Field of Search .......... 347/224, 101, 347/104, 105, 171, 212; 427/374.5; 118/59, 67; 355/30, 309; 432/59

[56] References Cited

U.S. PATENT DOCUMENTS 4,485,294 11/1984 Rosenberg .......... 219/216
5,563,681 10/1996 Kirkwold et al. .......... 355/30

FOREIGN PATENT DOCUMENTS 2003 389 8/1970 Germany .
3208048 9/1991 Japan .

*Primary Examiner*—Benjamin R. Fuller
*Assistant Examiner*—Thinh Nguyen
*Attorney, Agent, or Firm*—William K. Weimer

[57] ABSTRACT

A cooling article includes a plate positioned adjacent the exit of a thermal processor. The plate has a surface for receiving a sheet of thermally-processed material such that the sheet of thermally-processed material moves along the surface. A first region of the surface of the plate adjacent the exit of the thermal processor includes a thermally insulative material, whereas a second region of the surface of the plate on a side of the first region opposite the exit of the thermal processor includes a thermally conductive material. The sheet of thermally-processed material contacts the thermally insulative material during movement in the first region, and contacts the thermally conductive material during movement in the second region. The thermally insulative material prevents excessive heating of the first region of the cooling plate by leading portions of the sheet of thermally-processed material. The thermally insulative material thereby reduces defects in the trailing portion of the sheet of thermally-processed material due to uneven cooling. The reduction of defects contributes to improved quality in the images produced on sheets of thermally-processed material.

27 Claims, 2 Drawing Sheets

ARTICLE FOR COOLING A SHEET OF THERMALLY-PROCESSED MATERIAL

FIELD OF THE INVENTION

The present invention is generally directed to thermal processing technology and, more particularly, to techniques for cooling sheets of thermally-processed material with reduced defects.

DISCUSSION OF RELATED ART

Sheets of thermally-processed material are widely used in a variety of applications. For example, various medical, industrial, and graphic imaging applications use sheets of photothermographic materials to produce high-quality images. Sheets, as used in this description, may refer, for example, to short segments, longer lengths, or continuous rolls of photothermographic material. The photothermographic material is photographically exposed to form a latent image. A thermal processing apparatus is used to thermally develop the latent image.

To develop the latent image, the thermal processing apparatus heats the sheet to at least a threshold temperature for a period of time. Subsequently, the sheet of photothermographic material is cooled by a cooling article associated with the thermal processing apparatus to allow a user to hold the element while examining the developed image. The sheet of photothermographic material can be susceptible to defects caused by uneven cooling. The defects may not be uniform across the entire sheet. Rather, such defects may be more pronounced in certain portions of the sheet.

The trailing portion of the sheet, for example, can be more susceptible to processing defects. The trailing portion is the final portion of the sheet to exit the processing apparatus. As leading portions of a single sheet exit the thermal processing apparatus, they tend to heat the cooling article. The trailing portion of the sheet generally is unsupported and tends to drop downward immediately upon exit from the thermal processing apparatus. The trailing portion immediately contacts the hot cooling article previously heated by the leading portions of the sheet. Thus, the trailing portion of the sheet undergoes a different cooling profile than the leading portions, causing uneven cooling across the sheet. The uneven cooling leads to visible defects such as spots and streaks in the trailing portion.

SUMMARY OF THE INVENTION

The present invention is directed to an article for cooling sheets of thermally-processed material, to an apparatus for thermally processing a sheet of thermally-processable material, and to an apparatus for creating a visible image on a sheet of photothermographic material.

The cooling article of the present invention includes a plate positioned adjacent the exit of the thermal processor. The plate has a surface for receiving a sheet of thermally-processed material such that the sheet of thermally-processed material moves along the surface. A first region of the surface of the plate adjacent the exit of the thermal processor includes a thermally insulative material, whereas a second region of the surface of the plate on a side of the first region opposite the exit of the thermal processor includes a thermally conductive material. The sheet of thermally-processed material contacts the thermally insulative material during movement in the first region, and contacts the thermally conductive material during movement in the second region.

The thermally insulative material prevents excessive heating of the first region of the cooling plate by leading portions of the sheet of thermally-processed material. The thermally insulative material thereby reduces defects in the trailing portion of the sheet of thermally-processed material due to uneven cooling. The reduced defects can contribute, for example, to improved quality in the images produced on sheets of thermally-processed material.

The advantages of the present invention will be set forth in part in the description that follows, and in part will be apparent from the description, or may be learned by practice of the present invention. The advantages of the apparatus and method of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Figure 1:
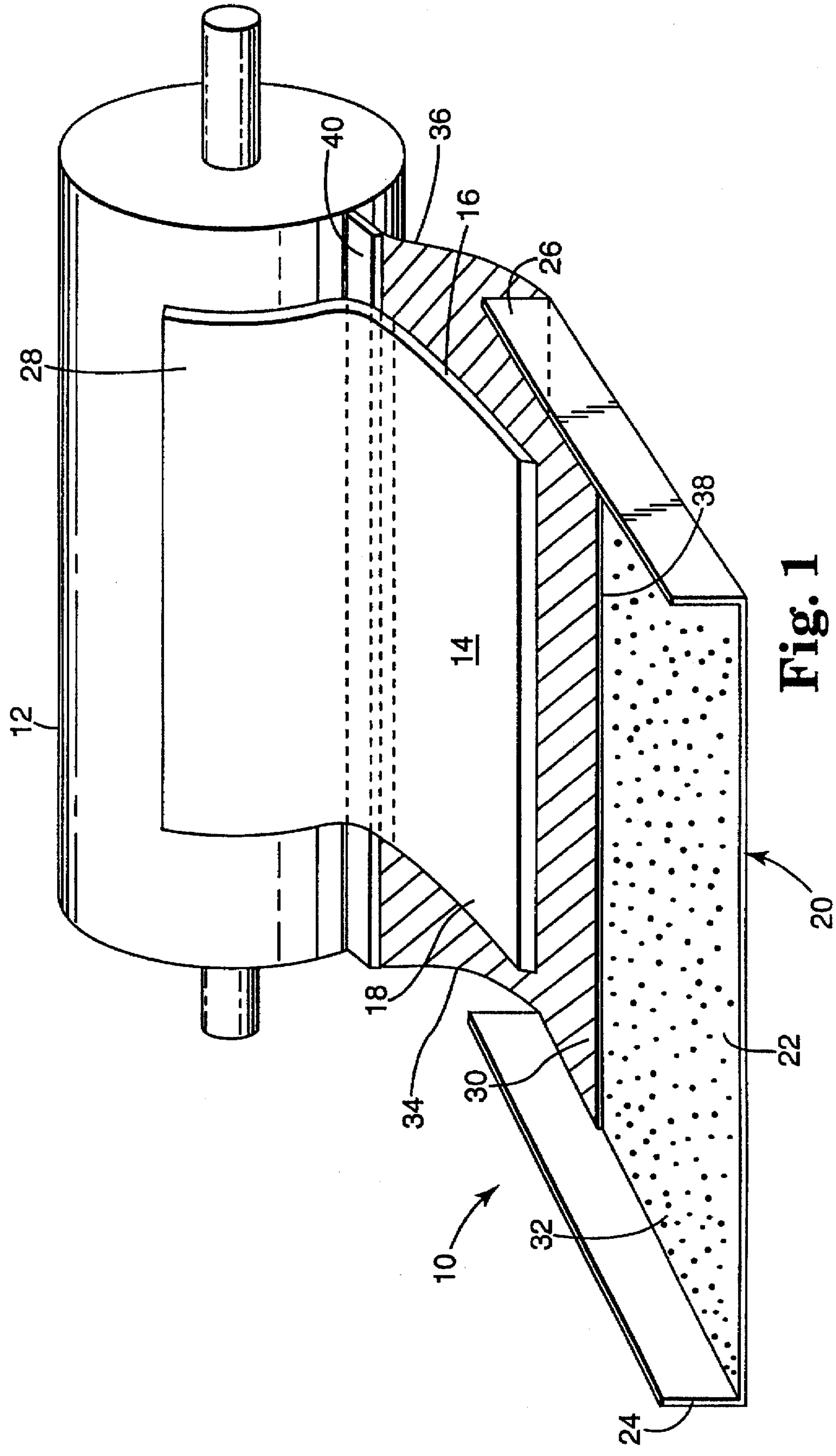
FIG. 1 is a perspective view of an exemplary cooling article, in accordance with the present invention.

FIG. 1 is a perspective view of an exemplary cooling article 10, in accordance with the present invention. In FIG. 1, cooling article 10 is positioned adjacent a thermal processing apparatus in the form of a heated drum 12. The cooling article 10 receives a sheet 14 of thermally-processed material from heated drum 12. The heated drum 12 forms a heating member within the overall thermal-processing apparatus. The sheet 14 may comprise, for example, a base 16 coated with a thermally-processable emulsion 18. The base 16 may comprise, for example, paper, polyester film, or the like. The emulsion 18 may comprise, for example, silver halide-based material, diazo material, or the like. The sheet 14 of thermally-processed material is shown in FIG. 1 as a relatively short segment. The sheet 14 may be realized by other formats such as, for example, longer lengths or continuous rolls of thermally-processed material.

The cooling article 10 includes a cooling plate 20 having a top surface 22 along which sheet 14 slides upon movement of the sheet outward from an exit associated with the thermal processing apparatus. The cooling plate 20 can be flat and stationary. The term stationary generally means that cooling plate 20 does not move while sheet 14 slides along the cooling plate. The cooling plate 20 can be made from a thermally conductive material such as aluminum, copper, steel, or the like. The cooling plate 20 withdraws heat from sheet 14 to cool the sheet to a sufficiently low temperature so that a user can pick up the sheet to examine the thermally-processed image.

In FIG. 1, cooling plate 20 is shown as contacting emulsion 18, although this is not necessary. Rather, cooling plate 20 could contact base 16. Using cooling plate 20, sheet 14 is cooled while remaining relatively flat and without being constrained or compressed. The lack of constraint and pressure allows for consistent dimensional changes within the sheet 14 during cooling. As a result, significant wrinkling is avoided.

To prevent cooling plate 20 from scratching or marring emulsion 18, top surface 22 of the cooling plate is relatively flat and smooth. To control the cooling rate of sheet 14, however, the top surface 22 is sufficiently textured. The texture slows the cooling rate because top surface 22, at any one instance, contacts only a portion of sheet 14 during movement of the sheet along cooling plate 20. As a result, top surface 22 withdraws heat from sheet 14 at a slower rate than if the top surface had not been textured. This slower cooling rate reduces the curling of the sheet 14 that otherwise can occur with more rapid, uneven cooling.

The texture may be realized, for example, by an array of pits extending only partially through the thickness of top surface 22 or, alternatively, by an array of holes extending through the entire thickness of the top surface. A texture that causes top surface 22 to contact approximately twenty to eighty percent of the portion of sheet 14 sliding over top surface 22 of cooling plate 20 balances the reduction of marring of emulsion 18 with the reduction of the curling of sheet 14. A texture that causes top surface 22 to contact approximately forty to seventy percent of the portion of sheet 14 sliding over cooling plate 20 more finely balances the reduction of marring and curling. A texture that causes top surface 22 to contact approximately fifty to sixty-five percent of the portion of sheet 14 sliding over cooling plate 20 even more finely balances the reduction of marring and curling.

The texture of top surface 22 has other beneficial effects. For example, when emulsion 18 is heated, gases can be formed and be released from the emulsion. When emulsion 18 contacts top surface 22, the gases can escape from between the emulsion and the top surface. This is referred to as outgassing. Without outgassing, trapped gases can adversely effect the emulsion surface and the image being developed within emulsion 18.

To effectively guide sheet 14 after the sheet is on cooling article 10, the cooling article can include side walls 24, 26. A top cover (not shown) also may be provided to form, along with side walls 24, 26, a chute through which sheet 14 can pass. The chute prevents sheet 14 from sliding sideways off cooling plate 20 and can direct the sheet to an exit port (not shown). In addition, the chute can be made sufficiently open with a generally C-shaped top cover so that sheets 14 that stick or jam within the chute can be easily cleared by an operator. The openness also prevents the trapping of hot air that could reduce convection within the chute and cause uneven cooling. Moreover, the openness and the absence of moving parts within the chute allows for simpler cleaning of residual emulsion 18 from the chute.

The side walls 24, 26 and top cover can be made of the same material as cooling plate 20. The side walls 24, 26 can be formed, for example, by bending lateral portions of cooling plate 20 upwardly. This eliminates sharp edges on which the ends of the sheet 14 can be scratched. The top cover can have the same textured surface and be welded to side walls 24, 26, or joined with an epoxy so that the textured surface faces top surface 22 of the cooling plate 20. To increase the thermal mass of cooling article 10, the cooling article can include one or more cooling fins, if desired. The cooling fins can be coupled to cooling plate 20 using, for example, epoxy.

Processing defects may not be uniform across the entire sheet 14 of thermally-processed material. Rather, such defects may be more pronounced in certain portions of sheet 14. For example, a trailing portion 28 of sheet 14 can be more susceptible to such defects. Specifically, trailing portion 28 is the final portion of sheet 14 to exit the thermal processing apparatus. As leading portions of a single sheet 14 exit the thermal processing apparatus, they tend to heat portions of cooling plate 20 adjacent the exit. The trailing portion 28 generally is unsupported and tends to drop downward immediately upon exit. The trailing portion 28 would immediately contact the hot portions of cooling plate 20 previously heated by the leading portions of the sheet, leading to visible spots or streaks.

To reduce such defects in trailing portion 28 and in other regions of sheet 14, in accordance with the present invention, top surface 22 of cooling plate 20 includes at least a first region 30 and a second region 32. The first region 30 of top surface 22 is disposed adjacent the exit of the thermal processor and includes a thermally insulative material. The second region 32 of top surface 22 is disposed on a side of first region 30 opposite the exit of the thermal processor and includes a thermally conductive material. The sheet 14 of thermally-processed material contacts the thermally insulative material during movement in first region 30 and contacts the thermally conductive material during movement in second region 32. The thermally insulative material in first region 30 ensures that trailing portion 28 of sheet 14 is not exposed to excessive heat immediately upon contact with cooling plate 20. The thermally insulative material in first region 30 prevents excessive heating of cooling plate 20 in the first region.

The first region 30 can be realized, for example, by placing a sheet 34 of thermally insulative material over a portion of top surface 22. The second region 32 can be realized, for example, by leaving a portion of top surface 22 exposed. The sheet 34 of thermally insulative material may, for example, be mounted flat on top surface 22 with an adhesive or mechanical fastening mechanism. Alternatively, as shown in FIG. 1, sheet 34 may have a first end 36 attached to the thermal processing apparatus, with a second end 38 placed over cooling plate 22. The first end 36 may be attached, for example, to a stripper 40 positioned on thermal processing drum 12. The stripper 40 can be positioned adjacent the exit of heated drum 12 to direct sheet 14 away from the heated drum at an angle. The first end 36 can be attached to stripper 40 with a clamp or other fastening mechanism.

By attaching first end 36 to the thermal processing apparatus, if desired, sheet 34 of thermally insulative material can be made to support sheet 14 of thermally-processed material and, in particular, trailing portion 28. The portion of sheet 34 proximate to second end 38 serves to thermally insulate sheet 14 from cooling plate 20. As a result, sheet 14 does not excessively heat cooling plate 20 in first region 30, reducing processing defects such as spots or streaks that otherwise could occur upon immediate contact of trailing portion 28 with the first region. As sheet 14 continues movement along cooling plate 20, it encounters second region 32, which then serves to cool the sheet.

The insulative effect of sheet 34 will depend, for the most part, on the coefficient of thermal conductivity of the material used to form the sheet, the thermal mass of the sheet, and the porosity, if any, of the sheet. The coefficient of thermal conductivity of the material will, of course, determine the conductivity per unit mass of the material. Given this coefficient, the thermal mass will determine the overall thermal conductivity. The porosity will determine the amount of surface area of sheet 34 that actually contacts top surface 22 of cooling plate 20 and the surface of sheet 14 of thermally-processed material. Thus, once a material with a given coefficient of thermal conductivity and a given porosity has been selected, the thermal mass can be determined by adjusting the thickness or length of sheet 34 to achieve a desired insulative effect.

Examples of suitable materials for use in making sheet 34 of the thermally insulative material include, for example, natural felts, synthetic felts, textile-based materials, non-woven materials such as blown micro fiber materials, and lower-friction rubbers with sufficient porosity. Other materials having relatively low coefficients of thermal conductivity may also be found suitable for manufacture of sheet 34. Effective insulative effect can be expected, for example, from a sheet 34 made from materials having a coefficient of thermal conductivity in the range of approximately 0 to 2.5 BTU/hour·foot·degree Farenheit (0 to 1.44 watts/meter·degree Centigrade) with a specific heat in the range of approximately 0 to 5.0 kilojoules/kilogram·degree Kelvin. More effective insulative effect can be expected, for example, from a sheet 34 made from materials having a coefficient of thermal conductivity in the range of approximately 0 to 0.05 BTU/hour·foot·degree Farenheit (0 to 0.029 watts/meter·degree Centigrade) with a specific heat in the range of approximately 0 to 1.0 kilojoules/kilogram·degree Kelvin.

The specific heat may be determined, for example, by selection of the thickness and surface area of sheet 34. With a given thickness, a better insulative effect can be achieved with a first region 30 that extends further along top surface 22 of cooling plate 20. However, a longer sheet 34 of thermally insulative material in first region 30 will reduce the length of second region 32. The reduced length of second region 32 can reduce the cooling effect of cooling article 10 and thus the through-put of sheets 14 of thermally-processed material through the cooling article. With a sheet 34 of thermally insulative material having a thickness in the range of approximately 0.0625 to 0.250 inches (0.159 to 0.635 centimeters), and a coefficient of thermal conductivity in the range of approximately 0 to 2.5 BTU/hour·ft·degree Farenheit (0 to 1.44 watts/meter·degree Centigrade), an acceptable balance between the insulative effect of first region 30 and the cooling effect of second region 32 can be obtained with, for example, a sheet length in the range of approximately 1.0 to 5.0 inches (2.54 to 12.7 centimeters) and preferably in the range of approximately 3.5 to 4.0 inches (7.62 to 10.16 centimeters). The above parameters may be varied to achieve insulative and cooling effects appropriate for specific cooling applications.

As an example, a cooling article 10 can be constructed, in accordance with the present invention, with a stainless steel or aluminum cooling plate 20 having a thickness of approximately 0.09 centimeters and a surface area of approximately 38.1 centimeters×16.5 centimeters. The side walls 24, 26 can be approximately 2.1 centimeters in height. The top surface 22, or at least second region 32, may have an array of pits extending partially through the thickness of cooling plate 20. The pits may correspond to a Rigid-Tax texture or pattern #3-ND, as obtained from Rigidized Metal Corp., of Buffalo, N.Y. This texture creates a top surface 22 that, at any one instance, contacts approximately 50–65 per cent of the portion of sheet 14 sliding over the cooling plate 20.

Alternatively, second region top surface 22 may be perforated to have an array of perforations that extend through the entire thickness of cooling plate 20. With a perforated second region 32, sheets of thermographic material can be cooled quickly without significantly affecting optical density uniformity. This is particuarly true for the first several photothermographic elements which are passed through cooling article 10. Because cooling article 10 can be at room temperature when the first several sheets are cooled, the significant temperature differential between the sheets and the cooling article 10 can affect optical density uniformity. The perforations allow the cooling article 10 to be more quickly heated to a steady-state temperature. As a result, the cooling process is less detrimental, in terms of optical density uniformity, to the first cooled sheets. An example of a cooling article having a cooling plate with perforations is disclosed in U.S. Pat. No. 5,563,681, to Kirkwold et al., filed Oct. 6, 1995, entitled "ARTICLE AND METHOD FOR COOLING A SHEET OF MATERIAL WHILE MINIMIZING WRINKLING AND CURLING WITHIN THE SHEET," and bearing attorney docket no. 51285USA9B. The entire content of the above-referenced patent is incorporated herein by reference.

Using a cooling article 10 constructed according to the above example, a sheet 14 of photothermographic material can be cooled from approximately 120 degrees Centigrade to approximately 50 degrees Centigrade, and at a rate of not less than one sheet 14 (above-described photothermographic sheet) every 30 seconds. Examples of a photothermographic sheet used with the exemplary cooling article 10 described above are disclosed in pending U.S. patent application Ser. No. 08/072,153, filed Nov. 23, 1993, and U.S. Pat. No. 5,434,043, both assigned to 3M Company, St. Paul, Minn., 55144. The size of this sheet 14 is approximately 35.6 centimeter×43.2 centimeter.

Figure 2:
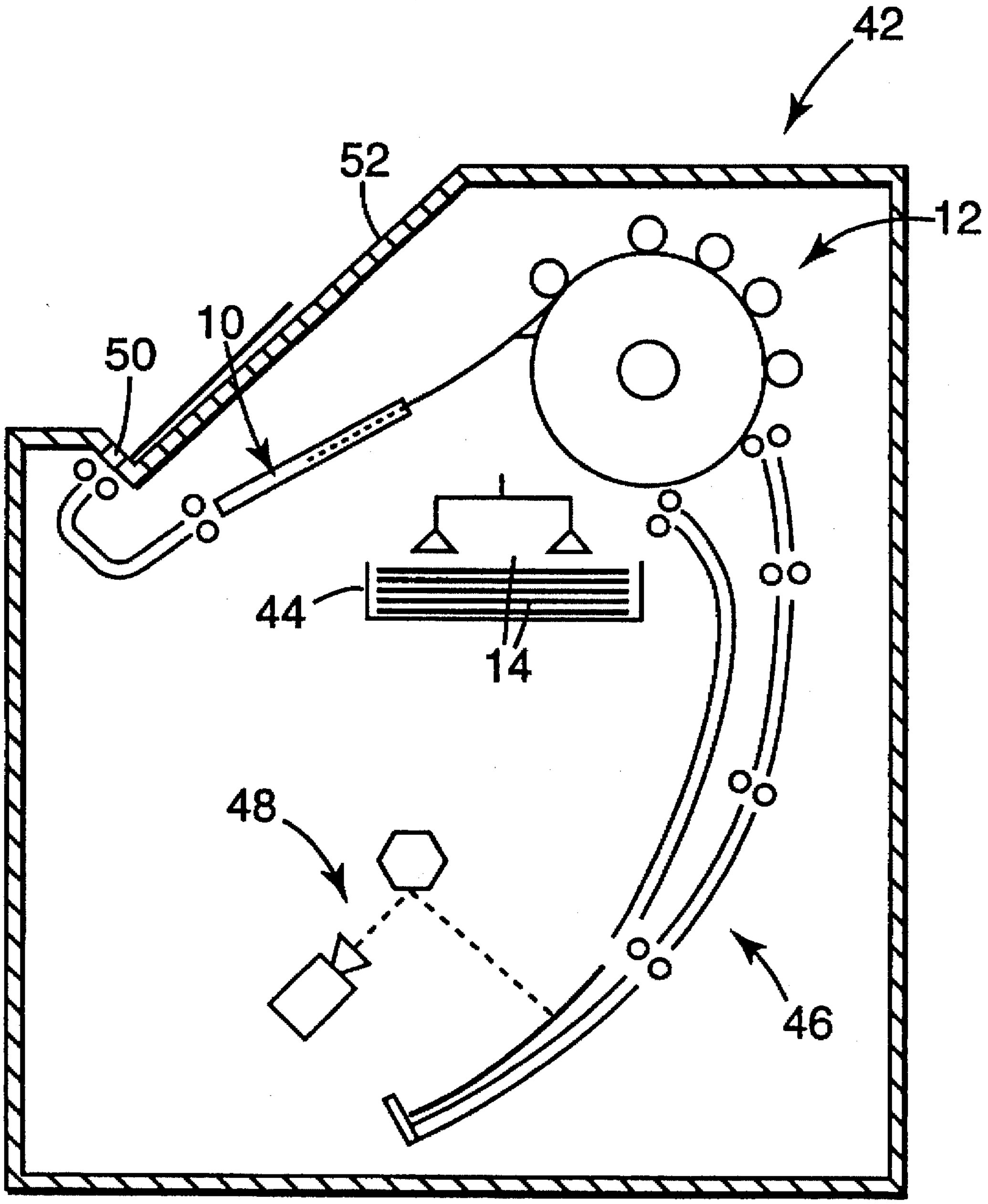
FIG. 2 is a side view of a photothermographic imager including the cooling article of FIG. 1.

The cooling article 10 and other components of thermal processing apparatus 12 can be part of a larger apparatus, such as the photothermographic imager 42 shown in FIG. 2. The photothermographic imager 42 can include a container 44 for holding sheets 14 of photothermographic material. Transport mechanisms 46 can transport sheets 14 from container 44 to an exposure station 48 and to thermal processing apparatus 12. The exposure station 48 scans a light beam onto sheet 14 in an image-wise pattern to create a latent image in the sheet. The thermal processing apparatus 12 heats the sheet 14 to a sufficient temperature for a sufficient duration to develop the latent image in the sheet to a visible image. The cooling article 10, as noted, cools sheet 14 before the sheet is transported through an exit slot 50 to a holding surface 52.

Having described the exemplary embodiments of the article of the present invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A cooling article for cooling a sheet of thermally-processed material upon movement of the sheet of thermally-processed material outward from an exit of a thermal processor, the cooling article comprising a plate positioned adjacent the exit of the thermal processor, the plate having a surface for receiving the sheet of thermally-processed material such that the sheet of thermally-processed material moves along the surface, wherein a first region of the surface of the plate adjacent the exit of the thermal processor includes a thermally insulative material, and a second region of the surface of the plate on a side of the first region opposite the exit of the thermal processor includes a thermally conductive material, the sheet of thermally-processed material contacting the thermally insulative material during movement in the first region and contacting the thermally conductive material during movement in the second region.

2. The cooling article of claim 1, wherein the thermally insulative material has a coefficient of thermal conductivity in a range of approximately 0 to 1.44 watts/meter degree Centigrade and a specific heat in the range of approximately 0 to 5.0 kilojoules/kilogram·degree Kelvin.

3. The cooling article of claim 1, wherein the thermally insulative material has a coefficient of thermal conductivity in a range of approximately 0 to 0.029 watts/meter·degree Centigrade and a specific heat in the range of approximately 0 to 1.0 kilojoules/kilogram·degree Kelvin.

4. The cooling article of claim 1, wherein the thermally insulative material comprises natural felt.

5. The cooling article of claim 1, wherein the thermally insulative material comprises synthetic felt.

6. The cooling article of claim 1, wherein the thermally insulative material comprises a textile-based material.

7. The cooling article of claim 1, wherein the thermally insulative material comprises a non-woven material.

8. The cooling article of claim 1, wherein the thermally insulative material is thermally insulative material placed over the first region of the surface of the plate.

9. The cooling article of claim 1, wherein the thermally insulative material comprises a sheet of thermally insulative material having a first end coupled to a portion of the thermal processor adjacent the exit of the thermal processor and a second end placed over the first region of the surface of the plate, the sheet of thermally insulative material supporting a portion of the sheet of thermally-processed material during movement of the sheet of thermally-processed material outward from the exit of the thermal processor.

10. An apparatus for thermally processing a sheet of thermally-processable material, the apparatus comprising:

a housing;

a heating member within the housing for heating the sheet of thermally-processable material; and· a cooling article for cooling the sheet of thermally-processable material upon movement of the sheet of thermally-processable material outward from an exit of the housing, the cooling article having a plate positioned adjacent the exit of the housing, the plate having a surface for receiving the sheet of thermally-processable material such that the sheet of thermally processable material moves along the surface, wherein a first region of the surface of the plate adjacent the exit of the housing includes a thermally insulative material, and a second region of the surface of the plate on a side of the first region opposite the exit of the housing includes a thermally conductive material, the sheet of thermally-processable material contacting the thermally insulative material during movement in the first region and contacting the thermally conductive material during movement in the second region.

11. The apparatus of claim 10, wherein the thermally insulative material has a coefficient of thermal conductivity in a range of approximately 0 to 1.44 watts/meter·degree Centigrade and a specific heat in the range of approximately 0 to 5.0 kilojoules/kilogram·degree Kelvin.

12. The apparatus of claim 10, wherein the thermally insulative material has a coefficient of thermal conductivity in a range of approximately 0 to 0.029 watts/meter·degree Centigrade and a specific heat in the range of approximately 0 to 1.0 kilojoules/kilogram·degree Kelvin.

13. The apparatus of claim 10, wherein the thermally insulative material comprises natural felt.

14. The apparatus of claim 10, wherein the thermally insulative material comprises synthetic felt.

15. The apparatus of claim 10, wherein the thermally insulative material comprises a textile-based material.

16. The apparatus of claim 10, wherein the thermally insulative material comprises a non-woven material.

17. The apparatus of claim 10, wherein the thermally insulative material is placed over the first region of the surface of the plate.

18. The apparatus of claim 10, wherein the thermally insulative material comprises a sheet of thermally insulative material having a first end coupled to a portion of the thermal processor adjacent the exit of the thermal processor and a second end placed over the first region of the surface of the plate, the sheet of thermally insulative material supporting a portion of the sheet of thermally-processable material during movement of the sheet of thermally-processable material outward from the exit of the thermal processor.

19. A system for forming a visible image on a sheet of photothermographic material, the system comprising:

a housing having an entrance, the entrance receiving a sheet of photothermographic material;

transport means, positioned within the housing, for transporting the sheet of photothermographic material within the housing;

an exposure station positioned within the housing, the exposure station receiving the sheet of photothermographic material from the transport means and exposing the sheet of photothermographic material element to an image-wise pattern of light to create a latent image on the sheet of photothermographic material;

a thermal processing station positioned within the housing, wherein the thermal processing station includes a heating member, the heating member receiving the sheet of photothermographic material transported by the transport means from the exposure station and heating the sheet of photothermographic element to process the latent image into the visible image; and a cooling article for cooling the sheet of photothermographic material upon movement of the sheet of photothermographic material outward from an exit of the housing, the cooling article having a plate positioned adjacent the exit of the housing, the plate having a surface for receiving the sheet of photothermographic material such that the sheet of photothermographic material moves along the surface, wherein a first region of the surface of the plate adjacent the exit of the housing includes a thermally insulative material, and a second region of the surface of the plate on a side of the first region opposite the exit of the housing includes a thermally conductive material, the sheet of photothermographic material contacting the thermally insulative material during movement in the first region and contacting the thermally conductive material during movement in the second region.

20. The apparatus of claim 19, wherein the thermally insulative material has a coefficient of thermal conductivity in a range of approximately 0 to 1.44 watts/meter·degree Centigrade and a specific heat in the range of approximately 0 to 5.0 kilojoules/kilogram·degree Kelvin.

21. The apparatus of claim 19, wherein the thermally insulative material has a coefficient of thermal conductivity in a range of approximately 0 to 0.029 watts/meter·degree Centigrade and a specific heat in the range of approximately 0 to 1.0 kilojoules/kilogram·degree Kelvin.

22. The apparatus of claim 19, wherein the thermally insulative material comprises natural felt.

23. The apparatus of claim 19, wherein the thermally insulative material comprises synthetic felt.

24. The apparatus of claim 19, wherein the thermally insulative material comprises a textile-based material.

25. The apparatus of claim 19, wherein the thermally insulative material comprises a non-woven material.

26. The apparatus of claim 19, wherein the thermally insulative material comprises a sheet of thermally insulative material placed over the first region of the surface of the plate.

27. The apparatus of claim 19, wherein the thermally insulative material comprises a sheet of thermally insulative material having a first end coupled to a portion of the thermal processor adjacent the exit of the thermal processor and a second end placed over the first region of the surface of the plate, the sheet of thermally insulative material supporting a portion of the sheet of photothermographic material during movement of the sheet of photothermographic material outward from the exit of the thermal processor.

* * * * *